United States Patent
Varga et al.

(10) Patent No.: US 9,621,378 B2
(45) Date of Patent: Apr. 11, 2017

(54) METHODS AND ROUTERS FOR CONNECTIVITY SETUP BETWEEN PROVIDER EDGE ROUTERS

(71) Applicant: Telefonaktiebolaget L M Ericsson (publ), Stockholm (SE)

(72) Inventors: Balázs Varga, Budapest (HU); Balázs Peter Gerö, Budapest (HU); Shahryar Khan, Rönninge (SE); David Sinicrope, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 120 days.

(21) Appl. No.: 14/646,694

(22) PCT Filed: Nov. 27, 2012

(86) PCT No.: PCT/EP2012/073704
§ 371 (c)(1),
(2) Date: May 21, 2015

(87) PCT Pub. No.: WO2014/082656
PCT Pub. Date: Jun. 5, 2014

(65) Prior Publication Data
US 2015/0312055 A1  Oct. 29, 2015

(51) Int. Cl.
*H04L 12/66* (2006.01)
*H04L 12/46* (2006.01)
(Continued)

(52) U.S. Cl.
CPC .......... *H04L 12/66* (2013.01); *H04L 12/4633* (2013.01); *H04L 12/4641* (2013.01);
(Continued)

(58) Field of Classification Search
CPC .................. H04L 47/10; H04L 47/30
See application file for complete search history.

(56) References Cited

U.S. PATENT DOCUMENTS

| | | | |
|---|---|---|---|
| 6,813,644 B1* | 11/2004 | Jamieson | H04L 12/4675 709/242 |
| 7,787,396 B1* | 8/2010 | Nalawade | H04L 45/02 370/254 |

(Continued)

OTHER PUBLICATIONS

International Search Report, PCT Application No. PCT/EP2012/073704, mailed Aug. 13, 2013.
(Continued)

*Primary Examiner* — Andrew Lai
*Assistant Examiner* — Zhiren Qin
(74) *Attorney, Agent, or Firm* — Myers Bigel, P.A.

(57) ABSTRACT

A router receives, from a BGP peer, a BGP update message including NLRI (VPN-NLRI) specific to a virtual private network, as well as path information including an address of a next hop for the VPN-NLRI. The router determines that there is no route to the next hop, modifies the filtering information to permit propagation of NLRI including the address of the next hop, and sends the modified filtering information to BGP neighbors. Alternatively, a router determines that such a BGP update message is due to be sent to a BGP peer. The router determines that the filtering information does not allow propagation, to the peer, of NLRI including the address of the next-hop, modifies the filtering information so as to permit propagation, to the BGP peer, of NLRI including the address of the next hop, and sends the BGP update message to the peer.

18 Claims, 6 Drawing Sheets

(51) Int. Cl.
*H04L 12/715* (2013.01)
*H04L 12/741* (2013.01)
*H04L 12/721* (2013.01)

(52) U.S. Cl.
CPC .............. *H04L 45/04* (2013.01); *H04L 45/46* (2013.01); *H04L 45/54* (2013.01); *H04L 45/66* (2013.01)

(56) References Cited

U.S. PATENT DOCUMENTS

| | | | | |
|---|---|---|---|---|
| 9,007,941 | B1* | 4/2015 | Miclea | H04L 29/0621 370/252 |
| 2006/0171404 | A1* | 8/2006 | Nalawade | H04L 45/02 370/401 |
| 2013/0117449 | A1* | 5/2013 | Hares | H04L 29/06 709/225 |
| 2013/0201909 | A1* | 8/2013 | Bosch | H04W 40/36 370/328 |

OTHER PUBLICATIONS

Written Opinion of the International Searching Authority, PCT Application No. PCT/EP2012/073704 mailed Aug. 13, 2013.
International Preliminary Report on Patentability, PCT Application No. PCT/EP2012/073704 mailed Feb. 13, 2015.
Houidi et al., "A new VPN routing approach for large scale networks", Network Protocols (ICNP), 2010 18$^{th}$ IEEE International Conference, pp. 124-133.
Y. Rekhter et al, "RFC 4271: A Border Gateway Protocol 4 (BGP-4)" The Internet Society, Network Working Group, Jan. 2006.
T. Bates et al, "RFC 2796: BGP Route Reflection—An Alternative to Full Mesh IBGP" The Internet Society, Network Working Group, Apr. 2000.
E. Rosen et al, "RFC 4364: BGP/MPLS IP Virtual Private Networks (VPNs)" The Internet Society, Network Working Group, Feb. 2006.
K. Kompella et al, "RFC 4761: Virtual Private LAN Service (VPLS) Using BGP for Auto-Discovery and Signaling" The IETF Trust, Network Working Group, Jan. 2007.
K. Kompella et al, "RFC 6624: Layer 2 Virtual Private Networks Using BGP for Auto-Discovery and Signaling" Internet Engineering Task Force (IETF), May 2012.
J. Moy et al, "RFC 2328: OSPF Version 2", The Internet Society, Network Working Group, Apr. 1998.
P. Marques et al, "RFC 4684: Constrained Route Distribution for Border Gateway Protocol/MultiProtocol Label Switching (BGP/MPLS) Internet Protocol (IP) Virtual Private Networks (VPNs)", The IETF Trust, Network Working Group, Nov. 2006.
E. Chen et al., "RFC 5291: Outbound Route Filtering Capability for BGP-4" IETF, Network Working Group, Aug. 2008.
E. Chen et al., "RFC 5292: Address-Prefix-Based Outbound Route Filter for BGP-4" IETF, Network Working Group, Aug. 2008.
Y. Rekhter et al, "RFC 3107: Carrying Label Information in BGP-4", The Internet Society, Network Working Group, May 2001.
E. Rosen et al., "RFC 3031: Multiprotocol Label Switching Architecture", The Internet Society, Network Working Group, Jan. 2001.
L. Andersson et al, "RFC 3036: LDP Specification", The Internet Society, Network Working Group, Jan. 2001.

* cited by examiner

Different RR-s for VPN and IP layer
route distribution supported

——— BGP session for IPv4      - - - - - - BGP session for VPNv4

METHODS AND ROUTERS FOR CONNECTIVITY SETUP BETWEEN PROVIDER EDGE ROUTERS

CROSS REFERENCE TO RELATED APPLICATION

This application is a 35 U.S.C. §371 national stage application of PCT International Application No. PCT/EP2012/073704, filed on 27 Nov. 2012, the disclosure and content of which is incorporated by reference herein in its entirety. The above-referenced PCT International Application was published in the English language as International Publication No. WO 2014/082656 A1 on 5 Jun. 2014.

TECHNICAL FIELD

The present invention relates to the field of computer networking and, in particular, to the field of packet-switched networks. In particular, the invention relates to methods, routers, computer programs and computer program products for connectivity setup between provider edge (PE) routers.

BACKGROUND

The Border Gateway Protocol (BGP) was originally developed in the late 1980s and at the beginning of the 1990s and has evolved into a widely used, mature protocol for interconnecting network domains, i.e. interconnecting autonomous systems (AS). As of November 2012, the current version of BGP is defined in Y. Rekhter et al, "*RFC 4271: A Border Gateway Protocol 4 (BGP-4)*", The Internet Society, Network Working Group, January 2006. BGP may for example be used to interconnect network domains operated by different service providers, such as different Internet service providers (ISPs). BGP is a protocol designed to exchange reachability information, i.e. information between routers as to which destination networks are reachable through which routers. BGP is designed to carry information about the path to be traversed by reachability information. The information is carried in a manner suppressing information looping and allowing incremental updates, i.e. sending only the changes in the reachability information, rather than periodically sending all the reachability information to all routers.

BGP is a path vector protocol. Each entry in a BGP routing table comprises the destination network, the next router, i.e. the next hop, and the path to reach the destination network.

BGP-capable routers are called BGP speakers. Neighbour BGP speakers are called BGP peers. Two BGP peers communicate with each other through a BGP session. A BGP speaker maintains, for each BGP session, a state variable in accordance with a finite state machine.

In a so-called full interior BGP mesh, all the reachability information is distributed to all BGP speakers within an AS as well as across autonomous system borders. To do so, within an AS, BGP sessions need to be established between each pair of BGP speakers. In practice, therefore, BGP sessions are established between each pair of border routers of an AS. Such a full-mesh solution is simple in terms of implementation. However, with the growth of the Internet, the size of most AS has significantly increased and, consequently, the size of the full meshes within these AS has significantly increased as well.

A solution to cope with this problem is route reflection, which involves the distribution of reachability information in accordance with the hub-and-spoke principle. Namely, a router in the AS acts as a hub for the distribution of the reachability information. Such a router is called a router reflector (RR). Route reflection significantly reduces the number of BGP sessions to be established within an AS and therefore leads to more efficient intra-domain connectivity. Furthermore, there may be more than one RR in an AS. Regarding route reflection, see also for example T. Bates et al, "*RFC 2796: BGP Route Reflection-An Alternative to Full Mesh IBGP*", The Internet Society, Network Working Group, April 2000.

In order to provide efficient inter-domain connectivity, constraining the distribution of reachability information through route filters may be used. Reachability information is marked and then distributed across the domains, or not, depending on how the reachability information is marked. In other words, reachability information is filtered out based on markers. For example, the use of Route Target (RT) communities enables to specify that, within a particular router, all the reachability information marked as belonging to a particular RT Community should, or should not, be filtered out. A Route Target community is a BGP extended community that conditions network layer reachability information based on virtual private network (VPN) membership, in applications that will now be explained.

Nowadays, BGP is also used to support other applications than traditional Internet applications, for example to carry reachability information for virtual private networks (VPNs). These developments have been made possible notably because the reachability information carried by BGP is not limited to IPv4 and IPv6 prefixes. In particular, the so-called BGP/MPLS VPNs (also known as 2547 VPNs) and BGP for VPN auto-discovery applications have been developed.

In the above-mentioned BGP/MPLS VPNs application, BGP is used to distribute VPN reachability information across a provider backbone and Multiprotocol Label Switching (MPLS) is used to transport VPN traffic from one VPN site to another over the provider backbone. The provider backbone may be made of several interconnected domains, each operated by a service provider. For example, E. Rosen et al, "*RFC 4364: BGP/MPLS IP Virtual Private Networks (VPNs)*", The Internet Society, Network Working Group, February 2006, describes a method by which a service provider may use an Internet Protocol (IP) backbone to provide IP VPNs for its customers. The purpose of a VPN is to maintain privacy of communication and address space. This method will be briefly explained with reference to FIGS. 1 to 4.

FIG. 1 schematically illustrates a set of four "sites" (the customer sites) attached to a common network (the IP backbone). The IP backbone, which is owned and/or operated by a service provider, provides an IP service to the customer. For example, a first VPN (VPN1) may involve customer sites 1 and 3 whereas a second VPN (VPN2) may involve customer sites 2 and 4.

The customer may attach to the backbone via a layer 2 service, but the layer 2 service is terminated at the "edge" of the backbone, where the customer's IP datagrams are removed from any layer 2 encapsulation, as schematically illustrated by FIG. 2.

As explained in RFC 4364, section 1.2, first paragraph, at the edge of a backbone, routers "can be attached to each other, or to end systems, in a variety of different ways: PPP connections, ATM Virtual Circuits (VCs), Frame Relay VCs, ethernet interfaces, Virtual Local Area Networks (VLANs) on ethernet interfaces, GRE tunnels, Layer 2 Tunneling Protocol (L2TP) tunnels, IPsec tunnels, etc." The term "attachment circuit" refers to the means of attaching to a router, as schematically illustrated in FIG. 3, so that two devices can be network layer peers over the attachment circuit.

In that context, and still referring to FIG. 3, each VPN site, i.e. customer sites 1 to 4, comprises at least one customer edge (CE) devices (although a customer site may be involved in more than one VPN). For example, CE device CE1 belongs to customer site 1, CE device CE2 belongs to customer site 2, etc. Each CE device is attached, through an attachment circuit, to one or more provider edge (PE) routers. For example, CE device CE1 is attached to PE router PE1, CE device CE2 is attached to PE router PE2, etc. Routers in the service provider's network (i.e., in the backbone) that do not attach to CE devices are known as P routers.

BGP is used by the service provider to exchange the reachability information, also called simply routes, of a particular VPN among the PE routers that are attached to that VPN. In BGP, a route is a unit of information that pairs a set of destinations with the attributes of a path to those destinations. The set of destinations are systems whose IP addresses are contained in one IP address prefix carried in the network layer reachability information (NLRI) field of a BGP update message. The path is the information reported in the path attributes field of the same BGP update message (RFC 4271, section 1.1). Routes are advertised between BGP speakers in update messages.

As explained in RFC 4364, BGP is used by the service provider to exchange the routes of a particular VPN among the PE routers that are attached to that VPN in a manner that ensures that routes from different VPNs remain distinct and separate, even though two VPNs may have an overlapping address space. Each route within a VPN is assigned a MPLS label. When BGP distributes a VPN route, it also distributes an MPLS label for that route. The PE routers distribute, to the CE routers in a particular VPN, the routes from other CE routers in that VPN. In such a manner, user data packets can be tunnelled through the service provider backbone, after having been encapsulated with the MPLS label corresponding to the customer's VPN and further encapsulated so that the packets is tunnelled across the service provider backbone to the proper PE router.

RFC 4364, section 4.3.2, explains how routes may be distributed among PE routers. Namely, if two sites of a VPN attached to PE routers that are in the same AS, the PE routers can distribute VPN-IPv4 routes to each other by means of a BGP connection between them. Alternatively, each can have an IBGP connection to a route reflector (RR), as explained above.

The same principles apply to the case of a multi-provider backbone, as schematically illustrated by FIG. 4. An autonomous system border router (ASBR) is a router located at the border between two AS operated by different service providers.

Furthermore, in the above-mentioned BGP for VPN auto-discovery application, BGP can be used so that a VPN can auto-discover its members in the sense that the set of PE routers having a VPN in common is identified. In other words, BGP is used to auto-discover the end points of a VPN. Instead of configuring a PE router with information about all the other PE routers of a given VPN, the PE router uses BGP to discover the other PE routers. Using Route Targets, the PE router announces to its BGP neighbours that it belongs to a particular VPN.

Regarding VPN auto-discovery using BGP, see for example K. Kompella et al, "*RFC 4761: Virtual Private LAN Service (VPLS), Using BGP for Auto-Discovery and Signaling*", The IETF Trust, Network Working Group, January 2007 (notably section 3.1), and K. Kompella et al, "*RFC 6624: Layer 2 Virtual Private Networks Using BGP for Auto-Discovery and Signaling*", Internet Engineering Task Force (IETF), May 2012.

It is desirable to improve the methods for setting up connectivity between PE routers of VPN(s) provided over a backbone, with in mind the need to reduce the provisioning burden on the service provider(s). This aim should be met without increasing, or at least without excessively increasing, the implementation and architecture complexity and the associated equipment costs.

SUMMARY

To meet or at least partially meet the above-mentioned goals, methods, network nodes, computer programs, and computer program products according to the invention are defined in the independent claims. Advantageous embodiments are defined in the dependent claims.

In one embodiment (hereinafter referred to as "solution A"), a method is carried out by a router, the router being at least one of an autonomous system border router (ASBR), an area border router (ABR), and a route reflector (RR). The router is also a BGP speaker. The router stores filtering information to limit the propagation of network layer reachability information (NLRI). At one point in time, the router receives, from another BGP speaker, a BGP update message comprising (i) NLRI specific to a virtual private network (VPN) (said NLRI being hereinafter referred to as "VPN-NLRI"), and (ii) path information comprising an address of a next hop for said VPN-NLRI. The router determines that there is no route established to the next hop. Then, the router modifies the filtering information (i.e., the filtering information stored on the router) so as to permit propagation of NLRI comprising the address of the next hop, and the router sends the modified filtering information to BGP neighbours of the router.

In another embodiment (hereinafter referred to as "solution B"), a method is carried out by a router which is also at least one of an ASBR, an ABR, and a RR. The router is also a BGP speaker and it stores filtering information to limit the propagation of NLRI. In solution B, the router determines that a BGP update message comprising (i) NLRI specific to a VPN (said NLRI being likewise hereinafter referred to as "VPN-NLRI"), and (ii) path information comprising an address of a next hop for said VPN-NLRI, is due to be sent by the router to another BGP speaker (hereinafter referred to as "BGP peer"). The router however determines that the filtering information (i.e., the filtering information stored on the router) does not allow propagation, to the BGP peer, of NLRI comprising the address of the next-hop. The router then modifies the filtering information so as to permit propagation, to the BGP peer, of NLRI comprising the address of the next hop; and the router sends the BGP update message to the BGP peer.

The two above-described solutions A and B constitute alternative solutions to the same particular problem of efficiently setting up connectivity between PE routers.

Namely, an intermediate router (i.e., an ASBR, an ABR, and/or a RR) of a backbone network (or of set of interconnected networks) faces a situation where the configuration and/or filtering information (such as well-known outbound or inbound routing filters, and more generally any filtering information according to the concept of constrained distribution of reachability/routing information) prevents the router from transferring reachability/routing information to its BGP neighbours (or some of them).

To solve the problem faced by the intermediate router, a manual reconfiguration (i.e., operator-controlled provisioning) of the filtering information on the intermediate router would be required. This is impractical. The invention proposes that the intermediate router be capable of reconfiguring itself to modify, when necessary, the filtering information stored on the router to override the existing filtering information and therefore to gradually populate the filtering information to permit propagation of NLRI pertaining to some desired VPNs to be quickly implemented on the provider backbone, without requiring any operator-controlled provisioning to define which propagation is permitted as part of the filtering information. The invention covers the cases where a determination (i.e., the detection of the "obstacle" preventing the router from transferring reachability/routing information to its BGP neighbours or some of them) is made based either (i) on the absence of any established route from the router to an announced next hop (solution A, for example involving consulting the router's forwarding information database) or (ii) on the actual filtering information stored on the router (solution B, for example involving consulting one of the router's existing ORFs).

In solution A, the method is always triggered by a received BGP update message. The intermediate router receives the VPN-NLRI and path information, checks whether there is a route established to the next-hop, updates its filter information if necessary, and sends the filter information to its BGP neighbours (or some of them). The BGP neighbours are responsible for the next-hop information propagation.

In solution B, the method is triggered by a situation where a BGP update message is due to be sent to a BGP peer, for example because a BGP update message has been received or for other reasons (e.g. manual reconfiguration, change of topology affecting the intermediate router, etc.). When the intermediate router is about to send a VPN-NLRI and path information, it modifies the filtering information if necessary and sends the BGP update message to the BGP peer.

The invention, and its two alternative solutions, therefore addresses the problem that prior art BGP VPN auto-discovery methods do not cover the automation of PE router to PE router connectivity setup. This problem arises from the assumption that the PE router to PE router connectivity, such as for example using label-switched paths (LSP), would be already set up beforehand, because there would a full mesh of connectivity, such as for example through LSPs, between PE routers.

In large scale IP/MPLS scenarios however, this is not the case, and filtering of BGP propagated information (for example based on RT communities) is implemented in order to keep BGP tables in some nodes small, e.g. access network devices. In such scenarios, PE to PE connectivity (e.g. a hierarchical LSP) is set up only if there is a VPN that requires that connectivity. Prior art systems do not allow setting up connectivity between two PE routers dynamically. Prior art systems require a proper configuration of the BGP filters of the intermediate routers at the outset or a manual configuration thereof, when necessary.

The invention provides means to automate the provisioning of PE to PE connectivity, such as for example hierarchical PE to PE LSPs. This is useful in network scenarios involving intermediate routers, where there is no full connectivity mesh between PE routers by default. The solutions proposed by the invention ensure that PE to PE connectivity (e.g. hierarchical LSPs) is available and only such connectivity is installed in the intermediate routers that is required by the services. Connectivity is gradually established within the intermediate routers, thus avoiding the need to have, by default, large filtering tables stored on the intermediate routers.

In the above context, an area border router (ABR) is a router that is connected to a plurality of areas of an Open Shortest Path First (OSPF) network within a single AS. For more information about OSPF, see for example J. Moy et al, "*RFC 2328: OSPF Version 2*", The Internet Society, Network Working Group, April 1998. A router may be both an ABR and ASBR at the same time.

The term "next hop" generally refers to the next router along a network path to a destination. Within a BGP update message, the next hop may be specified as a path attribute to define the address of the router to be used as the next router on the path to the destinations listed in the NLRI field of said BGP update message (see for example RFC 4271, section 5.1.3).

Regarding constrained route distribution and route filtering, see for example P. Marques et al, "*RFC 4684: Constrained Route Distribution for Border Gateway Protocol/MultiProtocol Label Switching (BGP/MPLS) Internet Protocol (IP) Virtual Private Networks (VPNs)*", The IETF Trust, Network Working Group, November 2006; E. Chen et al, "*RFC 5291: Outbound Route Filtering Capability for BGP-4*", IETF, Network Working Group, August 2008; and E. Chen et al, "*RFC 5292: Address-Prefix-Based Outbound Route Filter for BGP-4*", IETF, Network Working Group, August 2008, although the invention is not limited to these constrained route distribution and route filtering mechanisms. RFC 4684 notably defines Multi-Protocol BGP (MP-BGP) procedures that allow BGP speakers to exchange Route Target reachability information. This information can be used to build a route distribution graph in order to limit the propagation of Virtual Private Network (VPN) Network Layer Reachability Information (NLRI) between different autonomous systems or distinct clusters of the same AS. According to RFC 5291, outbound route filtering "allows a BGP speaker to send to its BGP peer a set of Outbound Route Filters (ORFs) that the peer would use to constrain/filter its outbound routing updates to the speaker". This enables a router to discard BGP updates which are not in the ORF, i.e. discarding unwanted updates (to save resources). This is useful in a VPN in which a subset of CE devices is not involved at all in the routes in the VPN (the subset is not attached to the VPN). RFC 5292 "defines a new Outbound Router Filter (ORF) type for BGP that can be used to perform address-prefix-based route filtering". Namely, the CE devices communicate to the PE router prefix-based outbound routing filtering to transmit only a subset of routes.

The invention also relates to network nodes implementing routing functions (i.e., routers) and comprising functional units and/or computer-executable instructions configured for carrying out the above-mentioned methods.

The invention also relates to computer program products and computer programs comprising computer-executable instructions configured, when executed on a network node or on a computer, to cause the network node or the computer to carry out a method according to any one of the above-described embodiments.

BRIEF DESCRIPTION OF THE DRAWINGS

Embodiments of the present invention shall now be described, in conjunction with the appended figures, in which.

DETAILED DESCRIPTION

The present invention shall now be described in conjunction with specific embodiments. These specific embodiments serve to provide the skilled person with a better understanding, but are not intended to in any way restrict the scope of the invention, which is defined by the appended claims.

Figure 1:
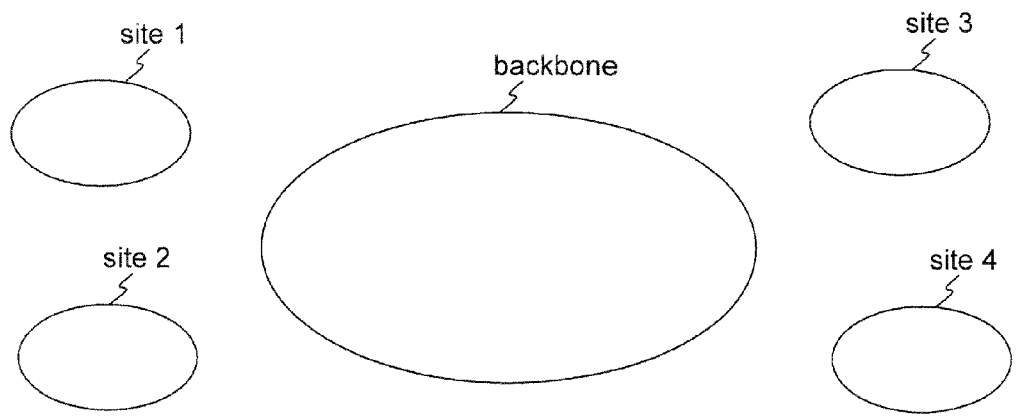
FIG. 1 schematically illustrates four customer sites and a service provider backbone, to explain the background of the invention.
Figure 2:
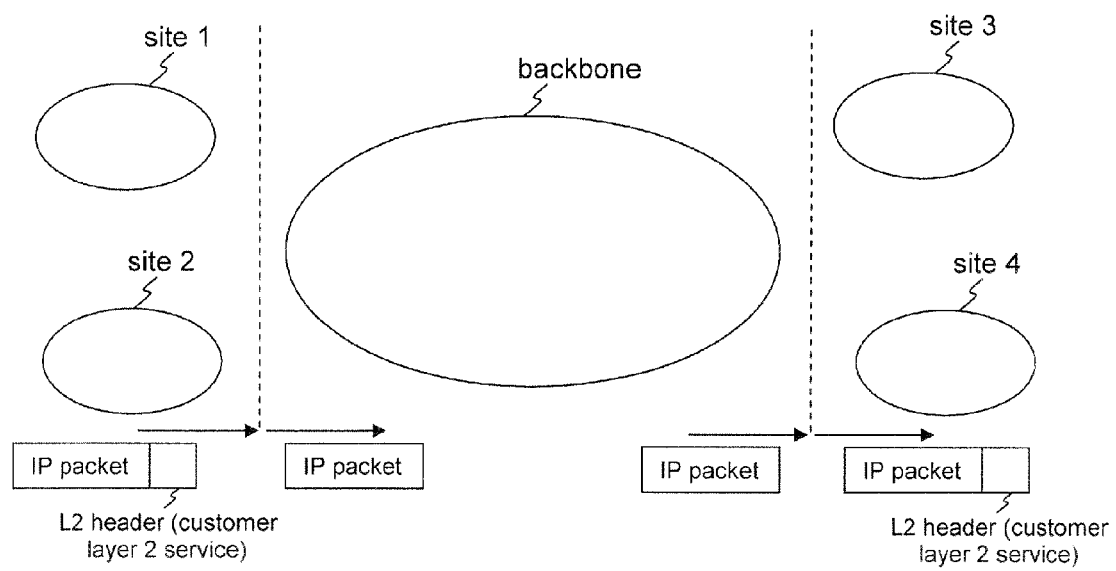
FIG. 2 schematically illustrates four customer sites and a service provider backbone, as well as the process occurring at the edge of the backbone, to explain the background of the invention.
Figure 3:
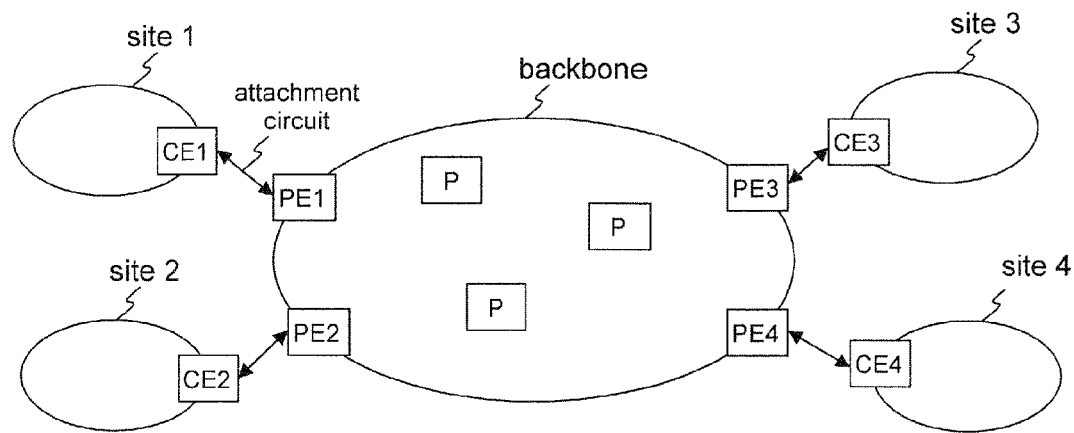
FIG. 3 schematically illustrates four customer sites and a service provider backbone, along with the CE devices and PE routers attached to each other, to explain the background of the invention.
Figure 4:
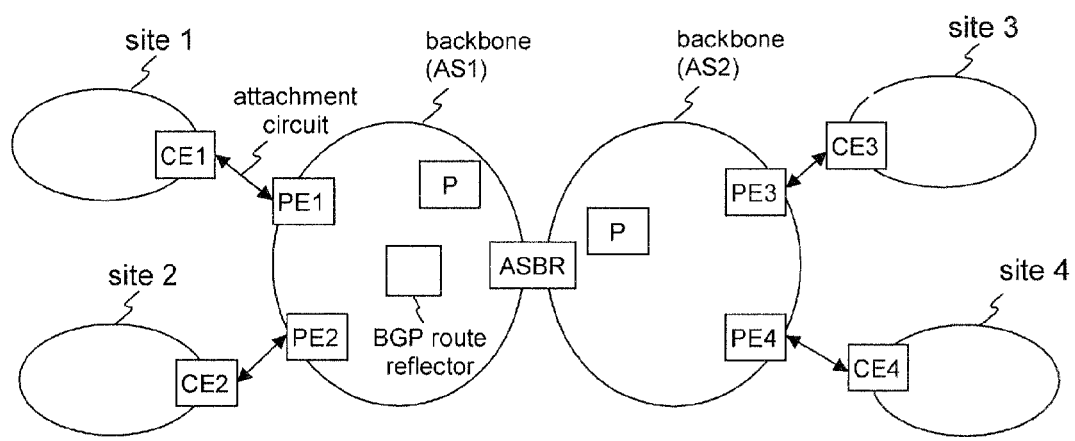
FIG. 4 schematically illustrates four customer sites and a multi-provider backbone, to explain the background of the invention.
Figure 5:
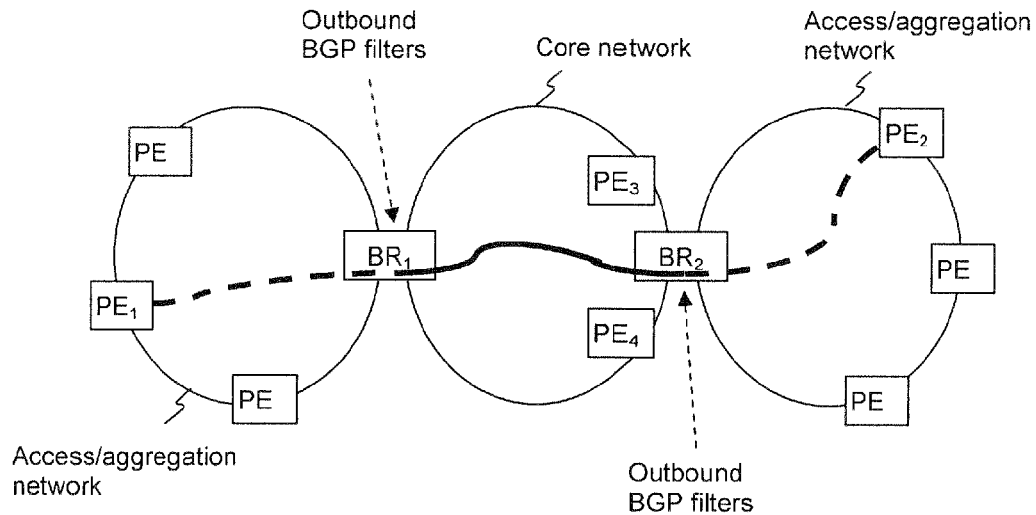
FIG. 5 schematically illustrates two access/aggregation networks and a core network with PE to PE connectivity established over them, to explain some of the problems that some embodiments of the invention solve.

To explain the problems that some embodiments of the invention solve, FIG. 5 schematically illustrates an IP/MPLS network, wherein route filtering is implemented between the core network (core domain) and each one of the access/aggregation networks (access/aggregation domains), as illustrated by the words "Outbound BGP filters" on FIG. 5. The access/aggregation and core domains are separate from an internal BGP (I-BGP) perspective. Route filtering is implemented at both autonomous system border router $BR_1$ and autonomous system border router $BR_2$. In this network, PE to PE connectivity (e.g., a hierarchical LSP) is set up only if there is a VPN that requires that connectivity.

In particular, the loopback IP address of e.g. $PE_2$ in FIG. 5 may be filtered by BGP e.g. in $BR_1$. Due to the BGP filter, there is no hierarchical LSP e.g. from $PE_1$ to $PE_2$ by default. This does not allow setting up a VPN service between e.g. $PE_1$ and $PE_2$ without manual configuration, i.e. without adjusting the BGP filters.

The same problem exists also for services spanning the network of multiple operators, e.g. in case of inter AS VPN option C (see RFC 4364, page 32).

Prior art VPN auto-discovery methods may be applied directly in multi-domain IP/MPLS deployments with BGP route filtering (see FIG. 5). However, as explained above, these solutions do not provide means to automate the provisioning of PE to PE connectivity, e.g. hierarchical PE to PE LSPs. Thus, all PE to PE connectivity has to be set up before the service is created, e.g. without applying any BGP ORFs in the RRs, or by adjusting BGP filters manually. At VPN creation, the local PE router (i.e., the PE router where the VPN was originally configured) distributes its new Route Target reachability information. When a BGP peer (intermediate router) receives a request for a new RT, it re-evaluates the advertisement status of NLRIs that match the RT in question and sends the VPN NLRIs corresponding to the RT back to the PE router. The PE router however cannot consider the newly received VPN NLRIs because it may not have connectivity, e.g. an LSP, to the BGP next hop of the VPN NLRI.

In other words, the PE router cannot create an LSP to the BGP next hop of the VPN NLRI. Label Distribution Protocol (LDP) cannot be used. Inter-domain LSPs are generally set-up using BGP labelled LSPs (as explained for example in Y. Rekhter et al, "*RFC* 3107: *Carrying Label Information in BGP-4*", The Internet Society, Network Working Group, May 2001). Such LSPs are also referred as H-LSP. However, in order to protect the resources of the routers in the access/aggregation domain, BGP advertisements are filtered using routing filters, such as for example ORFs (unless configured manually otherwise). In other words, the communication between BGP speakers is constrained by routing filters, such as for example outbound routing filters (ORF) which are by default not allowing any BGP-speaker-to-BGP-speaker communication (unless configured manually otherwise).

In one embodiment of the invention, the prior art Route Target based BGP auto-discovery method for VPN topology auto-discovery is extended to automate PE to PE connectivity, e.g. MPLS LSP set up. This is useful in network scenarios where there is no full mesh LSP-s between PE nodes by default. Namely, in one solution according to the invention, upon receiving a BGP update, an intermediate router (being a BGP speaker) inspects the BGP next hop attribute of the BGP update with VPN layer NLRI and adjusts its own and/or its peers' inbound/outbound route filters corresponding to the IP (v4 or v6) address of the BGP next hop in a way that IP layer reachability information is distributed to BGP speakers according to VPN topologies needs (meaning for example that the intermediate router needs to have an H-LSP to the BGP next-hop of the VPN-IPv4 prefix; H-LSPs to other BGP speakers are not used and can be filtered out).

Once the routing filter(s) have been adjusted (i.e. modified), a LSP may be established in accordance with a downstream unsolicited mode, so that, if a filter does not prevent it, the LSP is set up automatically. A change of filter implies a "soft-reset", i.e. resending the advertised information according to the new filter entries. A downstream unsolicited mode involves distributing label bindings to label switching routers (LSRs) that have not explicitly requested them (in that respect, see for example, E. Rosen et al, "*RFC* 3031: *"Multiprotocol Label Switching Architecture"*, The Internet Society, Network Working Group, January 2001, section 3.7; or L. Andersson et al, "*RFC* 3036: *LDP Specification*", The Internet Society, Network Working Group, January 2001, section 2.6).

Figure 6:
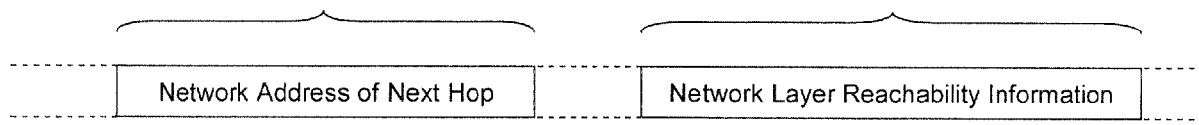
FIG. 6 schematically illustrates a BGP update message syntax.

The IP address of the BGP next hop may for example decoded from the BGP update message with VPN specific NLRI as shown in FIG. 6. The exact method is specific to a given VPN type. For example, for VPN-IPv4, the next hop consists of a Route Distinguisher field, which is set to zero, and the IP address of the BGP next hop. The BGP next hop IP address decoded from a BGP update with VPN layer NLRI is the address of the next hop for the VPN-NLRI.

In one embodiment of the invention, an intermediate router, after receiving service specific information, asks its BGP neighbour(s) to provide the necessary labelled IP layer reachability information if it does not exist already in the node. The method is agnostic to the technology of the service as long as the service distributes routing information via MP-BGP.

Figure 7:
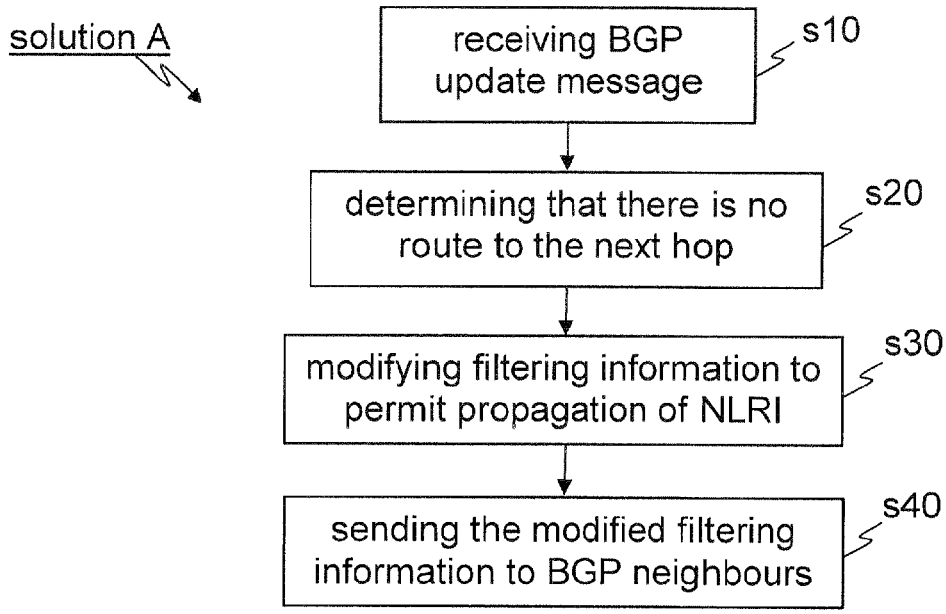
FIG. 7 is a flowchart of a method according to one embodiment (an embodiment of solution A) of the invention.

FIG. 7 is a flowchart of a method in one embodiment of the invention (an embodiment of solution A). The method is carried out by an intermediate router being an ASBR, an ABR, or a RR. The router is a BGP speaker, which stores filtering information to limit the propagation of NLRI. The router may for example use constrained route distribution and outbound route filtering (ORF) with its BGP neighbours. In other words, the filtering information stored on the router may comprise ORF information. The intermediate router may maintain a list of next-hop(s) used by its services and may ask its peers to advertise (labelled) IP layer reachability information by building and distributing ORF filter entries that allow distributing the IP addresses of the next-hop(s). Inbound route filtering may also be used.

In step s10, the intermediate router receives, from another BGP speaker, a BGP update message comprising NLRI specific to a virtual private network (said NLRI being here referred to as "VPN-NLRI"), and path information comprising an address of a next hop for said VPN-NLRI. The address may be an IP address, such as an IPv4 or IPv6 address, but is not limited thereto. In other words, the method is triggered by the receipt, by the intermediate router, of new VPN NLRI information. This may have resulted from several events at another BGP speaker such as a PE router, such as for example changing imported RT values on a PE router, changes in the network topology, etc.

In step s20, the intermediate router determines whether there is a route to the next hop. In other words, upon receiving a new NLRI for a VPN, the router checks the reachability of the next-hop(s) of the NLRI. If there is no route to the next hop, the method moves to step s30. If there is a route to the next hop (not illustrated on FIG. 7), then there is nothing to do. Step s20 of determining may be carried out based on the content of a forwarding information database (FIB) stored on the router, although other routing information databases may be used.

In step s30, the intermediate router modifies the filtering information so as to permit propagation of NLRI comprising the address of the next hop.

Then, in step s40, the intermediate router sends the modified filtering information to BGP neighbours of the router. This step may comprise advertising ORF information to the router's BGP neighbours. Advertising the ORF information to the router's BGP neighbours may be implemented by sending a BGP refresh message to the router's BGP neighbours. Step s40 of sending the modified filtering information to BGP neighbours of the router may also be limited to sending the modified filtering information to those BGP neighbours that are configured to store filtering information to limit the propagation of NLRI.

This method ensures that service related PE to PE connectivity (e.g. hierarchical LSPs) is available and only such hierarchical LSPs are installed in the PE node that is required by the services.

Figure 8:
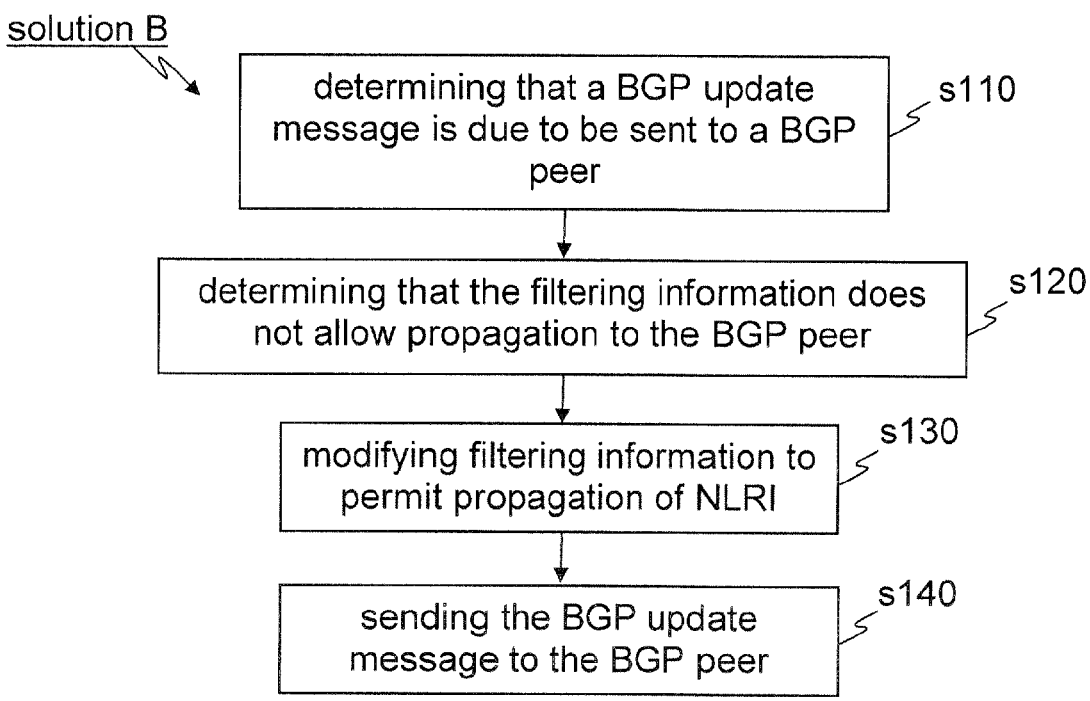
FIG. 8 is a flowchart of a method according to one embodiment (an embodiment of solution B) of the invention.

FIG. 8 is a flowchart of a method in one embodiment of the invention (an embodiment of solution B). The method is also carried out by a router being an ASBR, an ABR, or a RR. The router is also a BGP speaker, which stores filtering information to limit the propagation of NLRI. The router may for example use constrained route distribution and outbound route filtering (ORF) with its BGP neighbours. In other words, the filtering information stored on the router may comprise ORF information. The intermediate router may maintain a list of next-hop(s) used by its services and may ask its peers to advertise (labelled) IP layer reachability information by building and distributing ORF filter entries that allow distributing the IP addresses of the next-hop(s). Inbound route filtering may also be used.

In step s110, the intermediate router determines that a BGP update message comprising (i) NLRI specific to a virtual private network (said NLRI being hereinafter referred to as "VPN-NLRI"), and (ii) path information comprising an address (such as an IP address) of a next hop for said VPN-NLRI, is due to be sent by the router to another BGP speaker (BGP peer).

In step s120, the intermediate router determines whether the filtering information (stored on the intermediate router) allows propagation, to the BGP peer, of NLRI comprising the address of the next-hop. If the filtering information allows propagation (not illustrated on FIG. 7), then there is nothing to do. If the filtering information does not allow propagation, the method moves to step s130.

In step s130, the intermediate router modifies the filtering information so as to permit propagation, to the BGP peer, of NLRI comprising the address of the next hop. If the filtering information stored on the router comprises ORF information, step s130 comprises modifying the ORF information associated with the BGP peer.

Then, in step s140, the intermediate router sends the BGP update message to the BGP peer.

In other words, in one embodiment, every time a BGP speaker (such as for example BR$_1$ in FIG. 10) is about to send a BGP update message with VPN layer NLRI (step s110), it first checks (step s120) if the ORF filter corresponding to its peer BGP speaker contains the NLRI next hop. If so, it assumes that the peer is already receiving IP layer reachability information and hence, the peer is able to install the VPN route. If no, the BGP speaker modifies the ORF to allow the NLRI next hop (step s130), which will trigger a BGP update message to be sent to the peer with the IP layer reachability information of the NLRI next hop (step s140).

After step s140, the BGP peer has all the information (including H-LSP related information and VPN-NLRI related information) to be able to forward traffic. The BGP may then evaluate the received information and update its routing table entries (not illustrated on FIG. 8).

The router may be a RR for both the VPN-NLRI and the IP layer routes, and the step of sending s140 the BGP update message to the BGP peer may then comprise sending the BGP update message to the next hop with IP layer reachability information.

FIGS. 7 and 8 are not intended to define the timing and sequence between the BGP decision process (also triggered by the reception of a BGP update message) and the methods of these embodiments. The methods of these embodiments do not put any timing or sequence constraint on the BGP decision process. More background about the BGP decision process may for example be found in RFC 4271, section 9.

Figure 9:
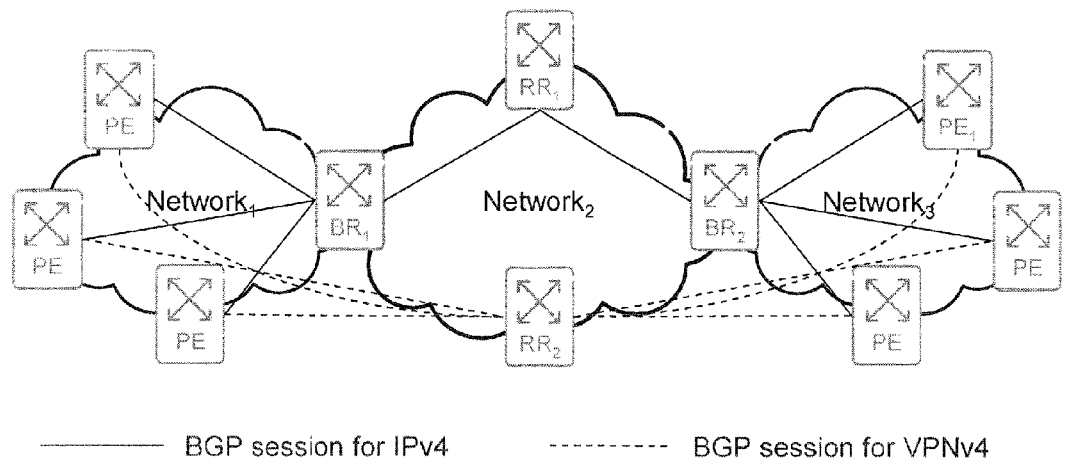
FIGS. 9 and 10 schematically illustrate two network configurations in which the method of the invention may be put into practice.
Figure 10:
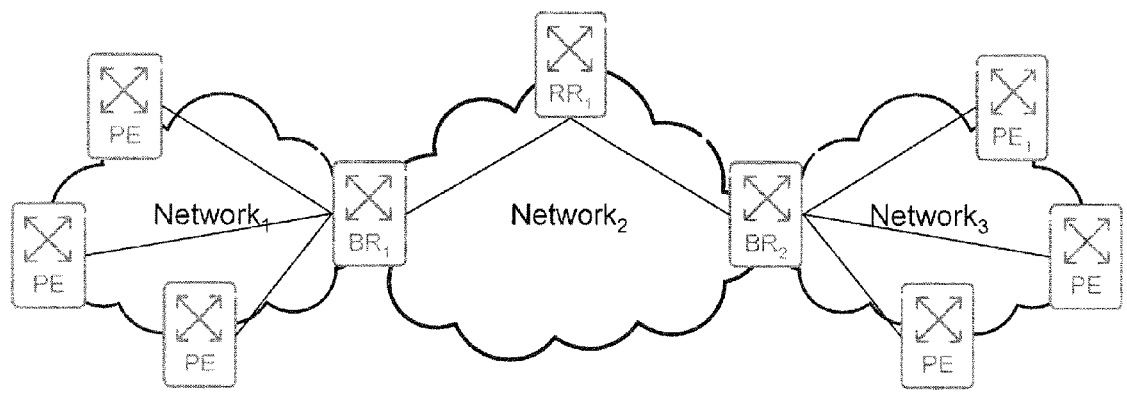

FIGS. 9 and 10 schematically illustrate two network configurations in which the method of the invention may be put into practice.

FIG. 9 shows that different BGP RRs may be set up for VPN layer NLRI distribution and for IP (v4 or v6) route distribution. For example $RR_1$ reflects IP routes and $RR_2$ reflects VPN NLRIs. On FIG. 9, VPNv4 is the prefix for a VPN-IPv4 address. For example, solution A may be carried out by $RR_2$ in the network configuration illustrated by FIG. 9.

FIG. 10 shows that the same RRs may be used to distribute VPN and IP layer routes. This is the case for example if the RRs are in the data path, but the invention is not limited to this configuration. In this network configuration, the BGP speaker nodes may run a simpler process to automate LSP setup. For example, solution A may be carried out by $BR_1$, $RR_1$ and/or $BR_2$ in the network configuration illustrated by FIG. 10. As another example, solution B may be carried out by $BR_1$, $RR_1$ and/or $BR_2$ in the network configuration illustrated by FIG. 10.

Figure 11:
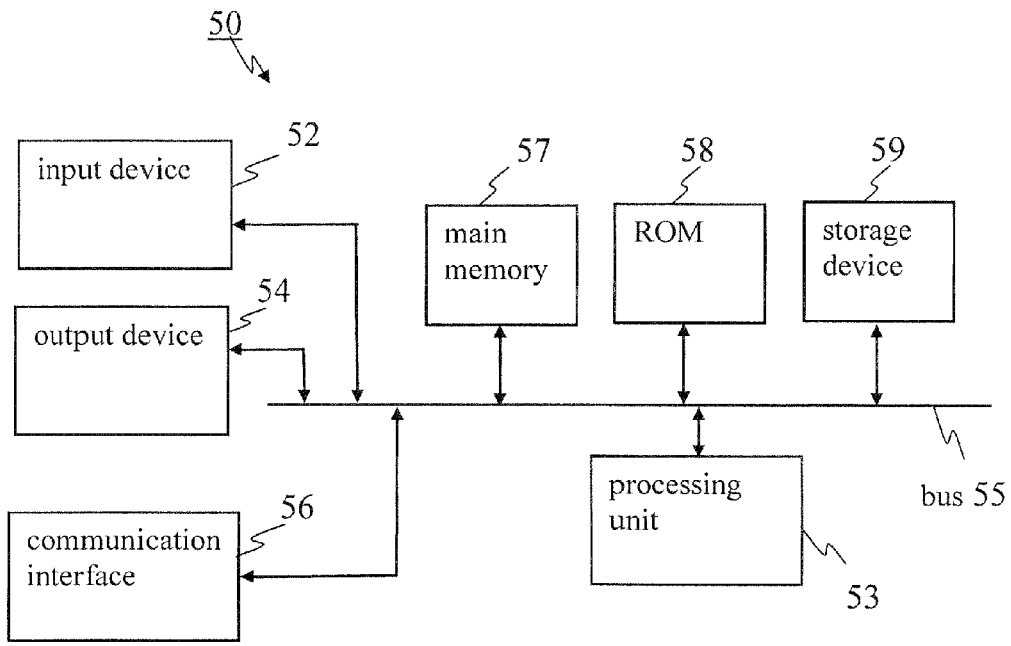
FIG. 11 schematically illustrates a possible implementation of a network node which may be used in one embodiment of the invention.

FIG. 11 is a schematic diagram of an exemplary implementation of a network node 50 that may carry out a method in accordance with embodiments of the invention. As illustrated, network node 50 may include a bus 55, a processing unit 53, a main memory 57, a ROM 58, a storage device 59, an input device 52, an output device 54, and a communication interface 56. Bus 55 may include a path that permits communication among the components of network node 50.

Processing unit 53 may include a processor, a microprocessor, or processing logic that may interpret and execute instructions. Main memory 57 may include a RAM or another type of dynamic storage device that may store information and instructions for execution by processing unit 53. ROM 58 may include a ROM device or another type of static storage device that may store static information and instructions for use by processing unit 53. Storage device 59 may include a magnetic and/or optical recording medium and its corresponding drive.

Input device 52 may include a mechanism that permits an operator to input information to network node 50, such as a keypad, a keyboard, a mouse, a pen, voice recognition and/or biometric mechanisms, etc. Output device 54 may include a mechanism that outputs information to the operator, including a display, a printer, a speaker, etc. Communication interface 56 may include any transceiver-like mechanism that enables network node 50 to communicate with other devices and/or systems. For example, communication interface 56 may include mechanisms for communicating with another device or system via a network.

Network node 50 may perform certain operations or processes described herein. These operations may be performed in response to processing unit 53 executing software instructions contained in a computer-readable medium, such as main memory 57, ROM 58, and/or storage device 59. A computer-readable medium may be defined as a physical or a logical memory device. For example, a logical memory device may include memory space within a single physical memory device or distributed across multiple physical memory devices. Each of main memory 57, ROM 58 and storage device 59 may include computer-readable media. The magnetic and/or optical recording media (e.g., readable CDs or DVDs) of storage device 59 may also include computer-readable media. The software instructions may be read into main memory 57 from another computer-readable medium, such as storage device 59, or from another device via communication interface 56.

The software instructions contained in main memory 59 may cause processing unit 53 to perform operations or processes described herein, such as, but not limited to, steps s10, s20, s30, s40, s110, s120, s130, and s140. Alternatively, hardwired circuitry may be used in place of or in combination with software instructions to implement processes and/or operations described herein. Thus, implementations described herein are not limited to any specific combination of hardware and software.

Figure 12A:
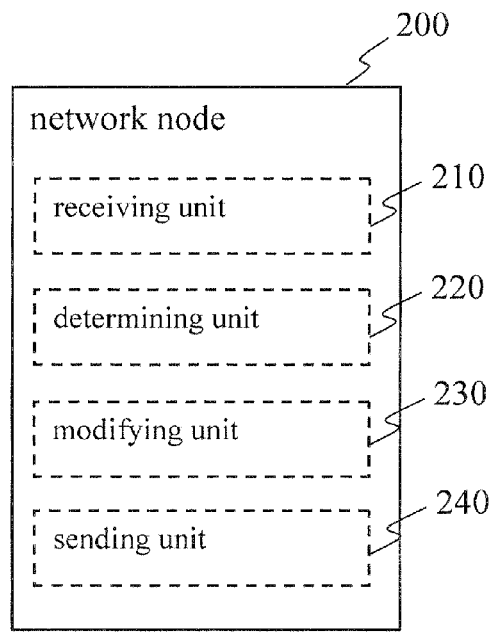
FIGS. 12a and 12b schematically illustrate two network nodes in accordance with two embodiments of the invention respectively.

FIG. 12a schematically illustrates functional units of a network node 200 according to one embodiment of the invention. The network node illustrated on FIG. 12a may for example be implemented as illustrated on FIG. 11. Network node 200 hosts a router function, and has the role of an ASBR, an ABR, and/or a RR. Network node 200 is a BGP speaker. It stores filtering information to limit the propagation of NLRI.

Network node 200 comprises a first unit 210, a second unit 220, a third unit 230, a fourth unit 240 hereinafter referred to as "receiving unit", "determining unit", "modifying unit" and "sending unit" respectively.

Receiving unit 210 is configured for receiving, from another BGP speaker, a BGP update message comprising (i) NLRI specific to a virtual private network, said NLRI being hereinafter referred to as "VPN-NLRI", and (ii) path information comprising an address of a next hop for said VPN-NLRI.

Determining unit 220 is configured for determining that there is no route to the next hop.

Modifying unit 230 is configured for modifying the filtering information so as to permit propagation of NLRI comprising the address of the next hop.

Sending unit 240 is configured for sending the modified filtering information to BGP neighbours of the network node 200.

Figure 12B:
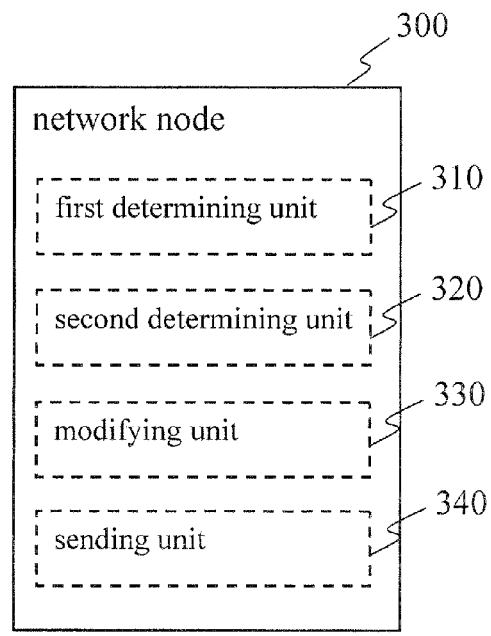

FIG. 12b schematically illustrates functional units of a network node 300 according to one embodiment of the invention. The network node illustrated on FIG. 12b may for example be implemented as illustrated on FIG. 11. Network node 300 hosts a router function, and has the role of an ASBR, an ABR, and/or a RR. Network node 300 is a BGP speaker. It stores filtering information to limit the propagation of NLRI.

Network node 300 comprises a first unit 310, a second unit 320, a third unit 330, a fourth unit 340 hereinafter referred to as "first determining unit", "second determining unit", "modifying unit" and "sending unit" respectively.

First determining unit 310 is configured for determining that a BGP update message comprising (i) NLRI specific to a virtual private network, said NLRI being hereinafter referred to as "VPN-NLRI", and (ii) path information comprising an address of a next hop for said VPN-NLRI, is due to be sent by the router to another BGP speaker (BGP peer).

Second determining unit 320 is configured for determining that the filtering information does not allow propagation, to the BGP peer, of NLRI comprising the address of the next-hop.

Modifying unit 330 is configured for modifying the filtering information so as to permit propagation, to the BGP peer, of NLRI comprising the address of the next hop.

Sending unit 340 is configured for sending the BGP update message to the BGP peer.

Where the term "receiving unit", "determining unit", "modifying unit", "sending unit", "first determining unit" and "second determining unit" are used herewith, no restriction is made regarding how distributed this element may be and regarding how gathered elements may be. That is, the constituent elements of a unit may be distributed in different software or hardware components or devices for bringing about the intended function. A plurality of distinct elements may also be gathered for providing the intended functionalities.

Any one of the above-referred units of a network node may be implemented in hardware, software, field-programmable gate array (FPGA), application-specific integrated circuit (ASICs), firmware or the like.

In further embodiments of the invention, the above-mentioned and/or claimed receiving unit, determining unit, modifying unit, sending unit, first determining unit and second determining unit are replaced by receiving means, determining means, modifying means, sending means, first determining means and second determining means respectively for performing the functions of the receiving unit, determining unit, modifying unit, sending unit, first determining unit and second determining unit.

In further embodiments of the invention, any one of the above-described procedures, steps or processes may be implemented using computer-executable instructions, for example in the form of computer-executable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method carried out by a router, wherein
the router is at least one of an autonomous system border router, an area border router, and a route reflector,
the router is also a Border Gateway Protocol (BGP) speaker; and
the router stores filtering information to limit the propagation of network layer reachability information (NLRI), wherein the filtering information comprises outbound route filtering information;
the method comprising:
receiving, from another BGP speaker, a BGP update message comprising
NLRI specific to a virtual private network (VPN-NLRI), and path information comprising an address of a next hop for said VPN-NLRI;
determining that there is no route to the next hop;
modifying the filtering information to permit propagation of NLRI comprising the address of the next hop, responsive to the determining; and
sending the modified filtering information to BGP neighbours of the router by advertising the outbound route filtering information to the router's BGP neighbours.

2. The method of claim 1, wherein the step of advertising the outbound route filtering information to the router's BGP neighbours comprises:
sending a BGP refresh message to the router's BGP neighbours.

3. The method according to claim 1, wherein the step of sending the modified filtering information to BGP neighbours of the router comprises:
sending the modified filtering information to those BGP neighbours that are configured to store filtering information to limit the propagation of NLRI.

4. The method according to claim 1, wherein the address of the next hop is an Internet Protocol (IP) address.

5. The method according to claim 1, wherein the step of determining that there is no route to the next hop is carried out based on the content of a forwarding information database stored on the router.

6. A method carried out by a router, wherein
the router is at least one of an autonomous system border router, an area border router, and a route reflector,
the router is also a Border Gateway Protocol (BGP) speaker; and
the router stores filtering information to limit the propagation of network layer reachability information (NLRI) wherein the filtering information comprises outbound route filtering information;
the method comprising:
determining that a BGP update message comprising
NLRI specific to a virtual private network (VPN-NLRI), and path information comprising an address of a next hop for said VPN-NLRI is due to be sent by the router to another BGP speaker (BGP peer);
determining that the filtering information does not allow propagation, to the BGP peer, of NLRI comprising the address of the next-hop;
modifying the filtering information to permit propagation, to the BGP peer, of NLRI comprising the address of the next hop; and
sending the BGP update message to the BGP peer by advertising the outbound route filtering information to the router's BGP neighbours.

7. The method of claim 6, wherein
the step of modifying the filtering information to permit propagation, to the BGP peer, of NLRI comprising the address of the next hop comprises modifying the outbound route filtering information associated with the BGP peer.

8. The method of claim 6, wherein the address of the next hop is an Internet Protocol (IP) address.

9. The method of claim 8, wherein
the router is a route reflector for both the VPN-NLRI and the IP layer routes, and
sending the BGP update message to the BGP peer comprises sending the BGP update message to the next hop with IP layer reachability information.

10. A network node for hosting a router function, wherein
the network node is at least one of an autonomous system border router, an area border router, and a route reflector,
the network node is also a Border Gateway Protocol (BGP) speaker; and
the network node stores filtering information to limit the propagation of network layer reachability information (NLRI), wherein the filtering information comprises outbound route filtering information;
the network node comprising:
a receiver configured to receive, from another BGP speaker, a BGP update message comprising
NLRI specific to a virtual private network (VPN-NLRI), and path information comprising an address of a next hop for said VPN-NLRI;
a determining circuit configured to determine that there is no route to the next hop;
a modifying circuit configured to modify the filtering information so as to permit propagation of NLRI comprising the address of the next hop; and
a transmitter configured to send the modified filtering information to BGP neighbours of the network node by advertising the outbound route filtering information to the router's BGP neighbours.

11. The network node of claim 10, wherein the transmitter operates so that advertising the outbound route filtering information to the network node's BGP neighbours comprises:

sending a BGP refresh message to the router's BGP neighbours.

12. The network node according to claim 10, wherein the transmitter is configured for:

sending the modified filtering information to those BGP neighbours that are configured to store filtering information to limit the propagation of NLRI.

13. The network node according to claim 10, wherein the address of the next hop is an Internet Protocol (IP) address.

14. The network node according to claim 10, wherein the determining circuit is configured for determining that there is no route to the next hop based on the content of a forwarding information database stored on the router.

15. A network node for hosting a router function, wherein the network node is at least one of an autonomous system border router, an area border router, and a route reflector, the network node is also a Border Gateway Protocol (BGP) speaker; and the network node stores filtering information to limit the propagation of network layer reachability information (NLRI), wherein the filtering information comprises outbound route filtering information;

the network node comprising:

a first determining circuit configured to determine that a BGP update message comprising NLRI specific to a virtual private network (VPN-NLRI), and path information comprising an address of a next hop for said VPN-NLRI is due to be sent by the router to another BGP speaker (BGP peer);

a second determining circuit configured to determine that the filtering information does not allow propagation, to the BGP peer, of NLRI comprising the address of the next-hop;

a modifying circuit configured to modify the filtering information to permit propagation, to the BGP peer, of NLRI comprising the address of the next hop; and a transmitter configured to send the BGP update message to the BGP peer by advertising the outbound route filtering information to the router's BGP neighbours.

16. The network node of claim 15, wherein the modifying circuit is configured for modifying the outbound route filtering information associated with the BGP peer.

17. The network node of claim 15, wherein the address of the next hop is an Internet Protocol (IP) address.

18. The network node of claim 17, wherein the network node is a route reflector for both the VPN-NLRI and the IP layer routes, and the transmitter is configured for sending the BGP update message to the next hop with IP layer reachability information.

* * * * *